March 29, 1960 P. LABOISSIERE 2,930,529
MULTIPLE ACCUMULATOR ACCOUNTING MACHINE
Filed July 19, 1954 9 Sheets-Sheet 1

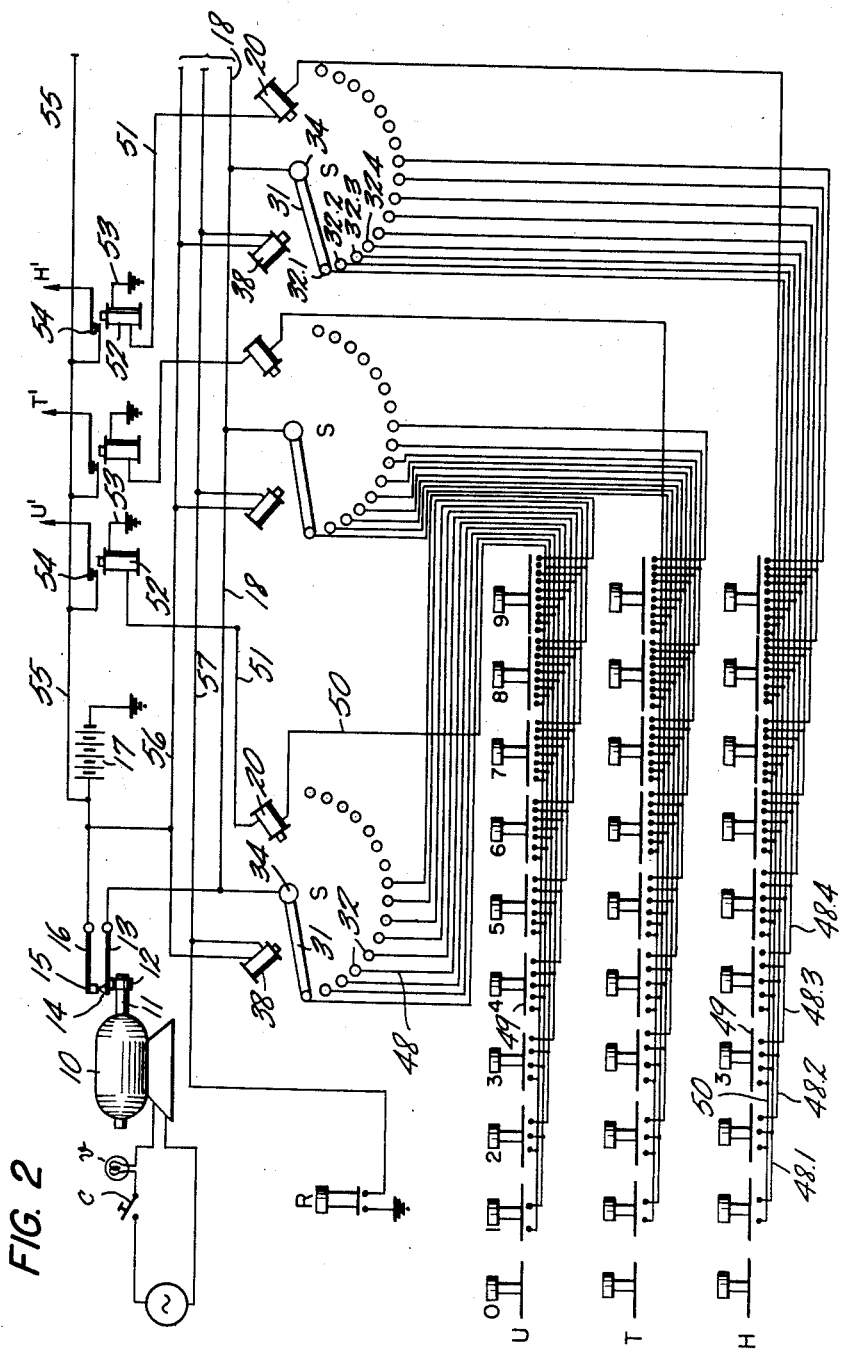

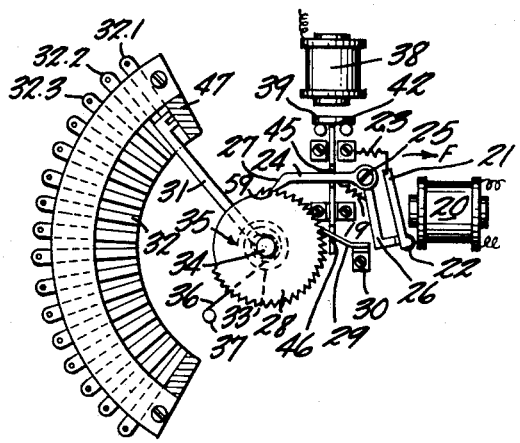
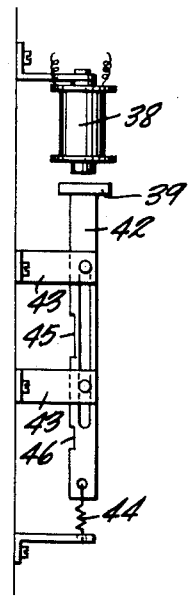
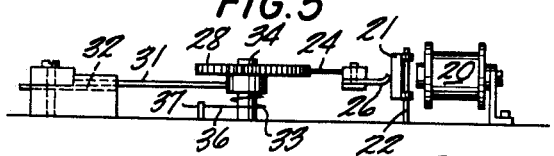
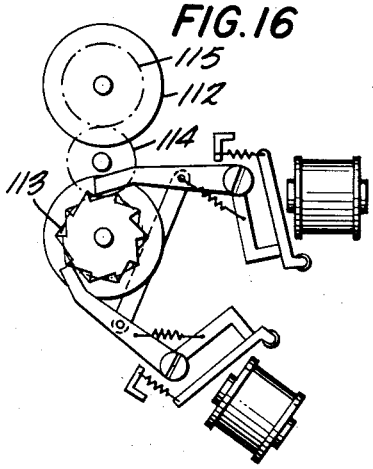
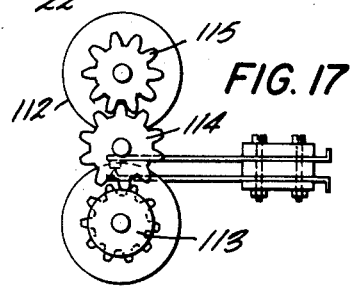
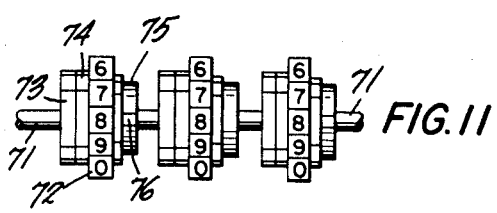

March 29, 1960   P. LABOISSIERE   2,930,529
MULTIPLE ACCUMULATOR ACCOUNTING MACHINE
Filed July 19, 1954                          9 Sheets-Sheet 6
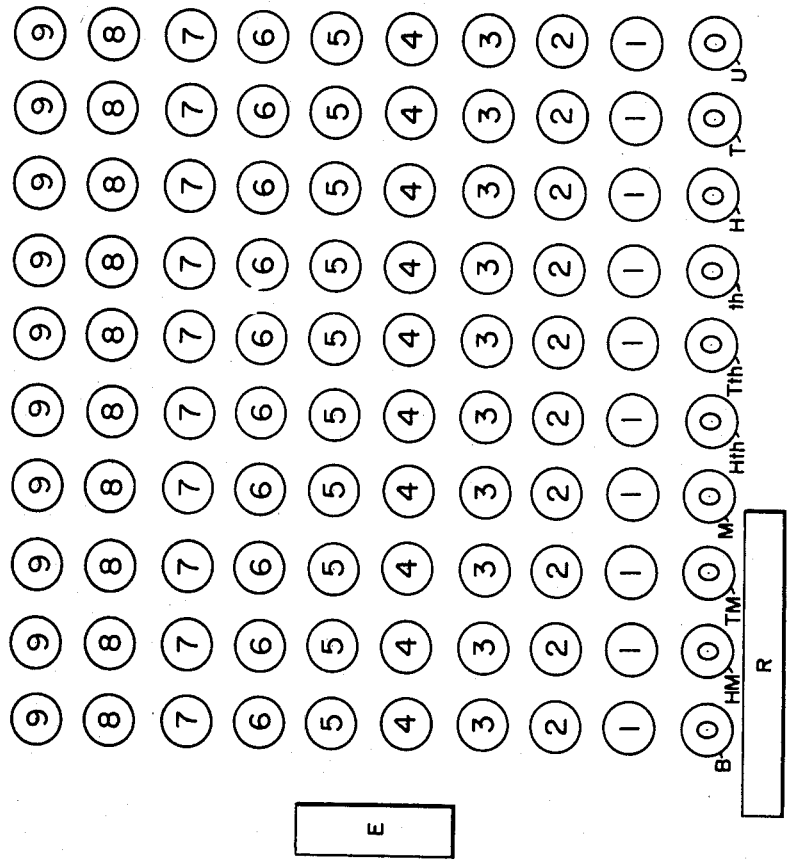
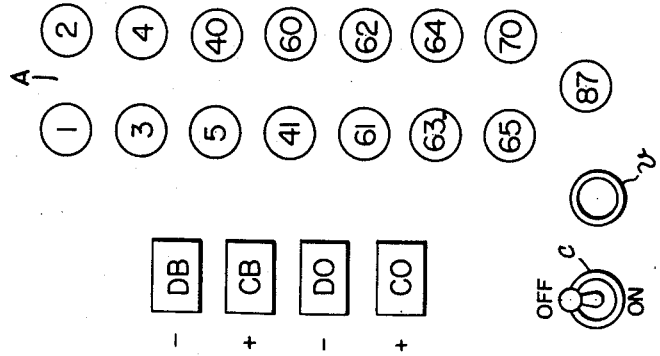
FIG. 6

March 29, 1960  P. LABOISSIERE  2,930,529
MULTIPLE ACCUMULATOR ACCOUNTING MACHINE
Filed July 19, 1954

United States Patent Office 2,930,529
      Patented Mar. 29, 1960

2,930,529

MULTIPLE ACCUMULATOR ACCOUNTING MACHINE

Pierre Laboissière, Nogent-sur-Marne, France

Application July 19, 1954, Serial No. 444,285

Claims priority, application France July 30, 1953

8 Claims. (Cl. 235—160)

This invention relates to an electromagnetic apparatus for recording and showing the items of an accountancy of a firm, this apparatus comprising a keyboard of which the different keys are depressed for recording book-keeping operations, or in other words for "posting entries," a plurality of totalizing counters corresponding to the various accounts and recording selectively the debit or credit capitals of these accounts as resulting from the operations effected through the actuation of said keyboard, a panel showing the debit and credit balances of these totalizing counters, and an electric equipment controlled by said keyboard and actuating selectively the relevant totalizing counters.

The apparatus according to the invention, or at least that portion thereof incorporating the keyboard, may advantageously be mounted on a typewriter of the type well known under the trade name of "National" or "Remington" to provide, in addition to the transmission of strictly book-keeping items, the complete wording of the accountable entries, and also the printing thereof on the firm's journal.

Moreover, with the mounting of the aforesaid keyboard on an accounting machine of the four-totalizer type it is possible to check permanently the entries concerning the balance (assets and liabilities) and the working account (debit-credit).

A preferred form of embodiment of the apparatus according to this invention is described hereafter solely by way of example with reference to the accompanying drawings, wherein:

Figures 1a, 1b and 1c illustrate diagrammatically and in block form the wiring arrangement of the apparatus, Figs. 1a and 1b being read as if they were connected through the line a—b, and Figs. 1b and 1c as if they were connected through the line b—c.

Figure 2 illustrates diagrammatically but more in detail one portion of the electric pulse generator of Fig. 1c.

Figures 3, 4 and 5 are a plane view from above, a fragmentary side view and another fragmentary side view, respectively, of a circuit selector of the type employed in the preselector device and in the pulse generator of the apparatus.

Figure 6 is a top view of the keyboard of the machine.

Figure 11 is a side view showing the three wheels of three adjacent assemblies of a same totalizing counter, the scale of this figure being extended in the common axial direction of these assemblies for the sake of clarity.

Figure 16 is a side view of one of the assemblies of a counter providing a double, i.e. positive and negative, indication.

Figure 17 is a detail view showing the contactor of the assembly of Fig. 16.

Figure 1A:
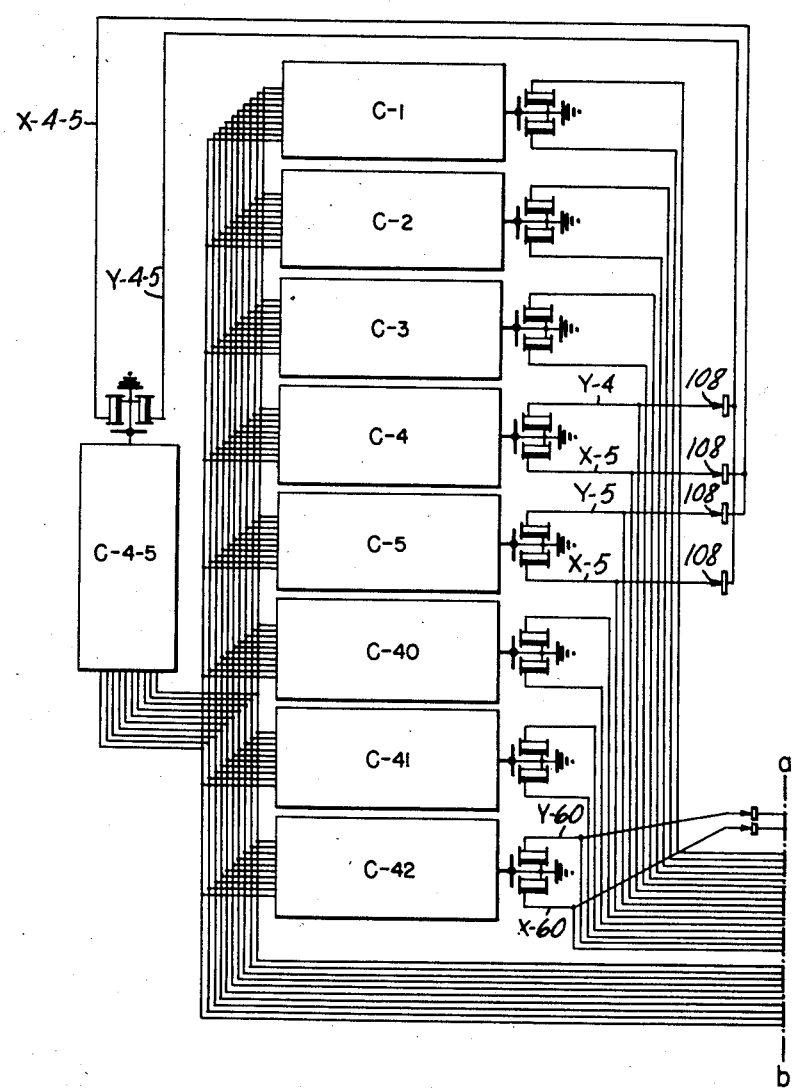
Figure 1a shows more specifically one portion of the totalizing counters of the apparatus.
Figure 1B:
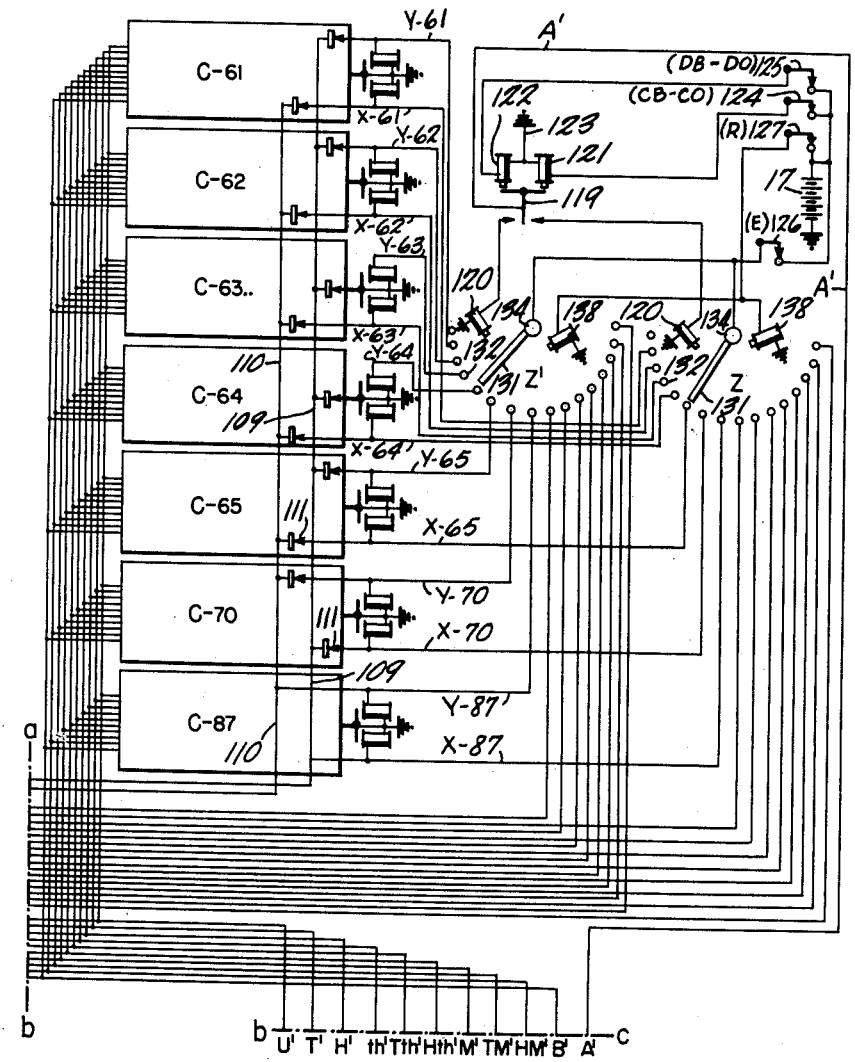
Figure 1b shows the remaining totalizing counters of the apparatus, together with the preselector for switching to the proper counter the electric pulses designed to actuate said counter.

The apparatus shown and described in the drawings is an account-keeping system for industrial or commercial firms and comprises essentially an electric pulse generator (Fig. 1c) controlled by means of a keyboard shown in Fig. 6, sixteen counters or accumulators of which some are shown in Fig. 1a and the other portion in Fig. 1b, and a preselector illustrated in the upper right-hand portion of Fig. 1b.

Figure 18:
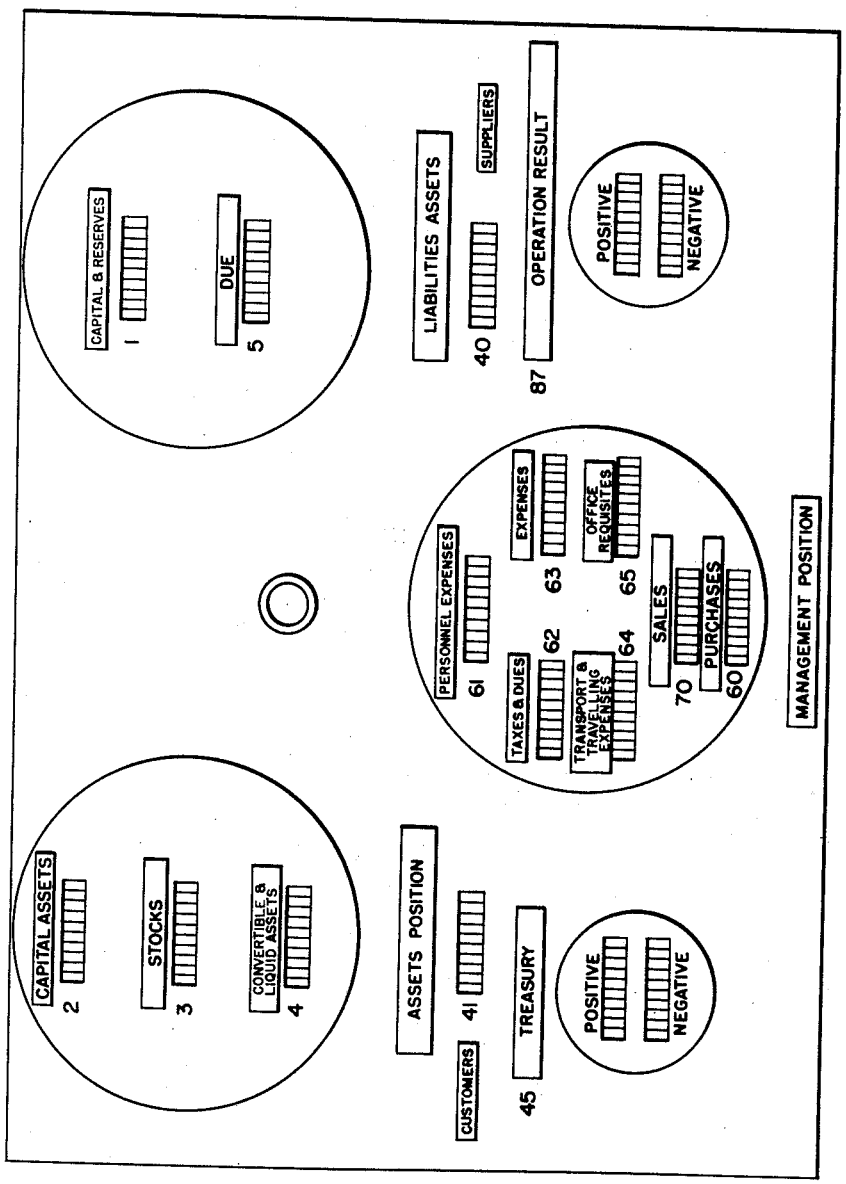
Figure 18 is a front view of the reading board or panel on which the indications supplied by the totalizing counters can be read by the user.

The indications supplied by the sixteen counters or accumulators appear simultaneously on a common reading board shown in detail in Fig. 18.

The following is a classification of the different accounts kept by the apparatus, which are divided into three groups. A first group includes the accounts dealing with the balance of the firm:

Account No. 1: Permanent or working capitals,
Account No. 2: Fixed assets,
Account No. 3: Stock account,
Account No. 4: Third-parties and financial debit account,
Account No. 5: Third-parties and financial credit account.

A counter designated by the reference letter C followed by the account number is assigned to each account of this first group. The data supplied by these counters appear at the upper portion of the panel, on the left for the accounts 2, 3 and 4 relating to the active position or assets, and on the right for the accounts Nos. 1 and 5 concerning the passive position or liabilities. Each account is controlled by a key positioned on the left-hand side of the keyboard.

Moreover, an additional counter designated by the reference numbers 4—5 will indicate at any time the positive or negative difference between the indications supplied by each of the last two counters 4 and 5. This additional counter is connected to each of these counters 4, 5 in a manner explained in a later part of this description, and is provided with a complemental set of numeral wheels causing a negative indication to appear on the panel as a complement of its positive indication.

Another group of accounts relates to the customers and suppliers, respectively, thus including:

Account No. 40: Suppliers,
Account No. 41: Customers.

To each account of this group there corresponds a counter and a key on the left-hand portion of the keyboard.

The indications given by the counter C–40 appear on the right-hand side of the reading board (liabilities), and those given by the counter C–41 on the left-hand side of the panel (assets).

A third group of accounts deal with the administration of the firm, viz.:

Account No. 60: Purchases,
Account No. 61: Personnel expenses,
Account No. 62: Taxes and dues,
Account No. 63: Real and personal estate expenses; general management expenses; financial expenses; equipments, redemptions, reserve funds,
Account No. 64: Transport and travelling expenses,
Account No. 65: Office requisites,
Account No. 70: Sales,
Account No. 87: Operation result.

As in the case of the preceding accounts, to each account of this group there corresponds a counter in the apparatus and a key on the left-hand side of the keyboard. The counter indications, except those given by the counter C–87, are grouped centrally of the reading board. The counter C–87 is operatively connected to each other counter of this group in a manner to be explained presently, for carrying out, in accordance with the indications supplied by these counters, the additions or subtractions which will finally give the position of the operation account No. 87. This counter is provided with a complemental set of numeral wheels showing in the reading board, beneath its positive indication, a negative indication complementary thereto. The indications supplied by the counter C–87 appear in the lower, right-hand portion of the panel, symmetrically to the indications of the counter C–4–5.

The keyboard of the apparatus comprises the following groups of keys:

(1) Four keys DB, CB, DO and CO, corresponding to the following book-keeping operations, respectively:

Debit balance,
    Credit balance,
    Debit operation,
    Credit operation.

These keys are employed to determine the positive or negatvie direction in which the accountant operation will be effected.

(2) Fifteen keys corresponding to the various accounts listed hereinabove. These keys are used to select the account in which the operation is to be effected.

(3) Ten groups of ten keys each, carrying digits numbered from 0 to 9, viz:

The units group U,
The tens group T,
The hundreds group H,
The thousands group $th$,
The ten thousands group T$th$,
The hundred thousands group H$th$,
The millions group M,
The ten millions group TM,
The hundred millions group HM, and
The billions group B.

These keys are used for setting the figure, in currency units, employed in the accountant operation.

The keyboard also includes:

An engagement bar E adapted to establish an electric contact prior to setting a number by means of the digit keys.

A return bar R adapted simultaneously to lift all the keys of the keyboard to their upper or inoperative positions.

An On-Off switch $c$.

A pilot-lamp $v$.

It will be noted that the different groups of keys and bars are arranged, from left to right (Fig. 6) in the order in which they are normally operated, thereby precluding any hesitation from the operator.

The pulse generator, counters and preselecting devices will be described hereafter, and subsequently the operation of the apparatus as a whole will be explained in detail.

I. PULSE GENERATOR

Figure 1C:
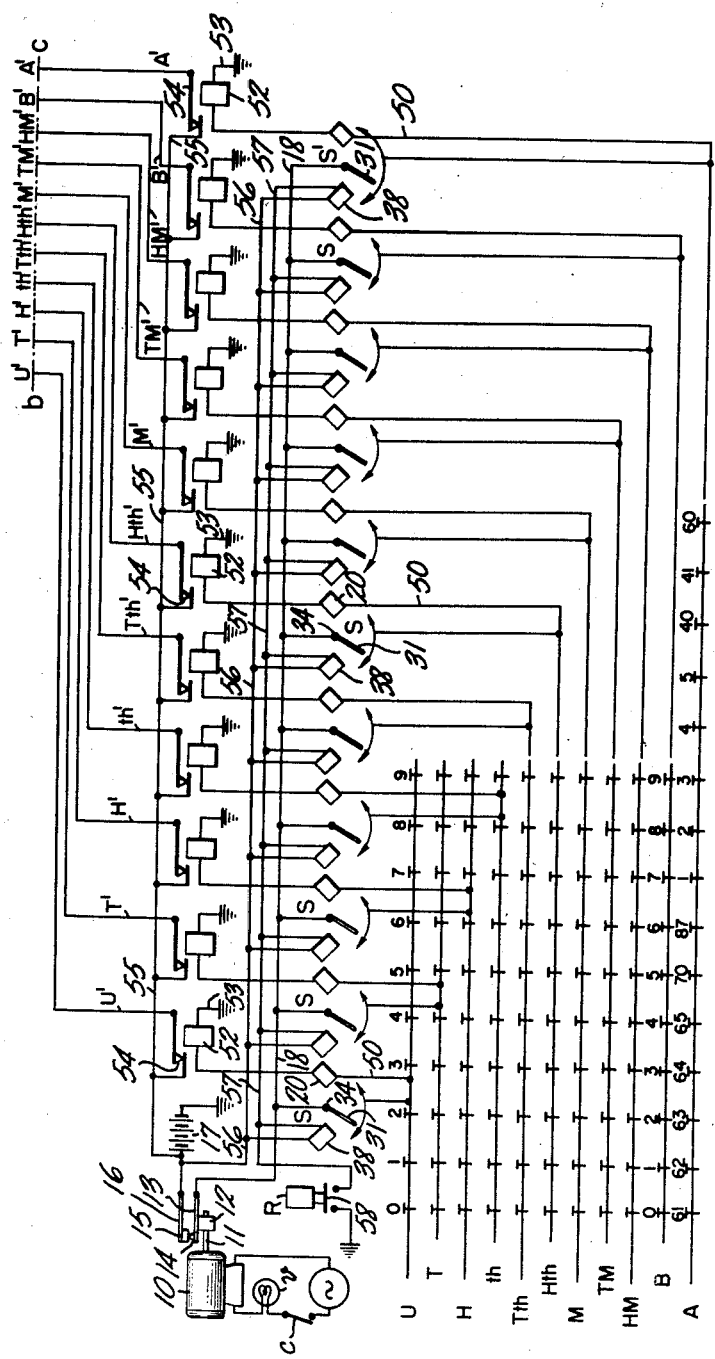
Figure 1c shows the generator producing the electric pulses for actuating the counters.

The electric device for generating the counter-operating pulses is shown diagrammatically in Fig. 1c and more in detail in Fig. 2, the latter showing however only one portion of the circuits controlled by the rows of keys. This pulse generator is adapted to feed each of the ten lines corresponding to the different unit orders with a number of pulses which is equal to the digit carried by the key actuated in this row. These ten lines are designated in the drawings by the same reference letters as those applied to the rows of digits of the keyboard, except that each symbol is followed by a prime, viz: U′, T′, H′, $th$′, T$th$′, H$th$′, M′, TM′, HM′, B′. To simplify the disclosure, these pulses will be termed hereafter "numeral pulses."

The pulse generator is also adapted to supply an eleventh line A′ controlled by the different account keys with a number of pulses corresponding to the depressed key, these pulses being adapted to actuate the preselector so that it will complete through the relevant counter the circuits of the ten lines fed with numeral pulses. To simplify the disclosure, the pulses fed to the line A′ will be called hereinafter "selective pulses," but it is emphasized that they are of same character as the other pulses and produced by a similar device.

The pulse generator comprises an asynchronous motor 10 connected to a mains supply and controlled by means of the panel switch $c$; the motor circuit has inserted therein the panel pilot-lamp $v$. The motor shaft 11 has keyed thereon a cam member 12 adapted, upon each revolution of the motor shaft 11, to lift a movable contact arm 13 carrying a contact 14 so that the latter will engage a fixed contact 15 carried by a fixed arm 16. These parts 13 to 16 constitute a contactor actuated at each revolution of the shaft 11 and connected on the one hand to one terminal of a source of D.C. current, consisting of a battery 17, the other terminal of which is earthed, and on the other hand to a wire 18 connected in turn to the different control circuits of a set of selectors S. The arrangement includes one selector S for each of the ten lines U to B corresponding to the various digit orders, an additional selector being assigned to the A wire. The mechanical structure of one selector S is shown in Figs. 3 to 5, but it will be understood that all the selectors are identical.

Each selector comprises an electromagnet actuator consisting of a coil 20 having a fixed core and a movable armature 21 fulcrumed on a fixed pivot pin 22 and urged by a spring 23 to a position away from the fixed core. An arm 24 is pivotally connected through a pivot pin 25 on a rod 26 rigid with the armature 21. This arm 24 carries at its free end a pawl 27 adapted to engage the teeth of a ratchet wheel 28 provided with a resilient retaining pawl 29 secured to a bracket 30. A tension spring 19 connects the arm 24 to the rod 26 to permanently urge the pawl 27 towards the teeth of the ratchet wheel 28. The ratchet wheel 28 carries a radial arm 31 the outer end of which is adapted selectively to engage the contacts 32 of a segment-like contact assembly.

The angular distance between two contacts 32 is equal to that between two adjacent teeth of the ratchet wheel 28. The number of contacts 32 is the same for every selector in order to simplify their manufacture, but in a number of selectors only ten contacts are provided and connected to circuit wires, as will be explained presently. A spiral spring 33 wound around one end to the shaft 34 of the ratchet wheel 28 is anchored at its end 35 to the ratchet wheel and at its other end 36 to a fixed bracket 37 and is thus adapted constantly to urge the ratchet wheel 28 in the clockwise direction as observed in Fig. 3, wherein the arm 31 rigid with the ratchet wheel is in its inoperative or zero position.

Each selector S is also provided with a return electromagnet consisting of a coil 38 having a fixed core and a coaxial movable armature 39. This armature 39 is rigid with a slide rod 42 mounted for sliding axial motion in a pair of guide brackets 43 and urged by a spring 44 to a position away from the electromagnet coil 38. This armature rod 39 has formed therein a pair of notches 45, 46 and the parts are so arranged that the arm 24 extends through the first notch 45 and the pawl 29 through the other notch 46. The width of these notches is sufficient to enable the arm 24 and pawl 29 to move thereacross when the armature 39 is in its inoperative position, in which it is shown in Fig. 3, that is, when the electromagnet coil 38 is de-energized. On the other hand, when the electromagnet coil 38 is energized and attracts the armature 39 and its notched rod 42, the notches are so arranged and positioned that their edges lift the arm 24 and pawl 29 so as to free them completely from the teeth of the ratchet wheel 28 and to enable this ratchet wheel to be rotated in the clockwise direction by its return spring 33 until the outer end of arm 31 engages the stop 47.

The coil 20 (see Figs 1c and 2) is connected in series with a circuit from contactor 14, 15 through wire 18. This circuit passes through the ratchet wheel shaft 34, arm 31, keys 32 and their relevant wires 48 in parallel, contactors 49 of the keyboard key group corresponding to the selector concerned, wire 50 common to all the contacts 32 and also to all the keys of this group, this wire 50 feeding the coil 20, and a wire 51 connected to one terminal of a relay 52 having its other terminal earthed at 53. The key "0" of the group of keys concerned (see Fig. 2) does not close any contact. Key "1" is adapted to close a contact to connect the common wire 50 to the wire of the first contact 32 of the selector, key 2 is adapted to close the contact between the same common wire 50 and the wires of the first and second contacts 32 of the selector, and so forth, up to the key "9" which connects the wire 50 to the first nine contacts 32 of the selector.

The relay 52 controls a contact 54 connecting through a wire 55 the source of D.C. current 17 to the digit group corresponding to the selector and group of keys concerned thereto.

Thus, the three selectors shown in Fig. 2 correspond to the groups of keys U, T and H, respectively of the units, tens and hundreds. The relays 52 of these selectors control the contacts 54 of the relevant wires U', T' and H'.

Fig. 1c shows only diagrammatically the set of contacts 32 of each selector, the wires 48 and the contacts adapted to be closed by the keys between the wires 48 and the common wire 50 of each selector. However, this figure shows the eleven selectors in block form, viz.:

Ten selectors S corresponding to the ten groups of keys representing respectively the different orders of units and utilized for transmitting numeral pulses. Each selector of this series has only its first nine contacts connected to the wire 48, and an eleventh selector S' identical with the former and corresponding to the keys through which the accounts are identified. This selector S' has its first fifteen contacts connected to wires 48. The corresponding group of keys, designated by the letter A, comprises fifteen keys carrying the numbers of the different accounts. The contacts actuated through these keys are mounted in the same manner as those actuated through the digit numbers shown in Fig. 2, with the only difference that there are fifteen keys connecting respectively the common wire 50 of selector S' with one, two, three, ... up to fifteen wires 48 connected to the first fifteen contacts 32. Contact 54 of selector S' connected the wire 55 and therefore the D.C. source 17 to the wire A' for supplying selective pulses thereto.

The return coil 38 of each of the eleven selectors is connected across a common wire 56 (connected in turn to the D.C. source 17) and another common wire 57 earthed through a switch 58 actuated by the return bar R of the keyboard.

II. COUNTERS

The ten wires U' to B' supplied with the numeral pulses transmitted from the generator are connected to sixteen counters as shown in Figs. 1a and 1b. Each counter is constructed for effecting at will additions or subtractions. Fifteen counters correspond to the accounts listed hereinabove, and also to one key of the group A of the keyboard. The sixteenth counter C-4—5 corresponds to the balance or difference between the accounts 4 and 5 of which it gives the value automatically; this sixteenth counter is not controlled by a key.

The first fifteen counters are the counters C-1, C-2, C-3, C-4, C-5, C-40, C-41, C-60 shown in Fig. 1a, and counters C-61, C-62, C-63, C-64, C-65, C-70, C-87 shown in Fig. 1b.

Moreover, both counters C-4—5 and C-87 are provided with a complemental set of numeral wheels.

Each counter is of the ten-digit type and includes ten coaxial elements each comprising a plurality of wheels arranged side-by-side. Fig. 11 shows the wheels of three adjacent elements of a same counter.

Figure 7:
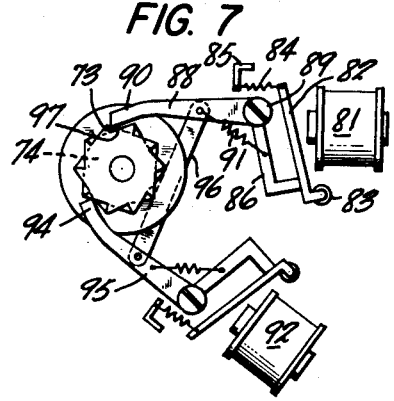
Figure 7 is a side view showing one of the component assemblies of a totalizing counter.
Figure 13:
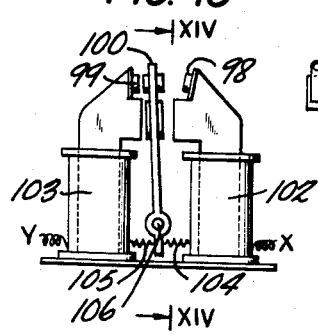
Figure 13 is a side view of a ten-contact rocking relay or reversing switch of a totalizing counter.
Figure 14:
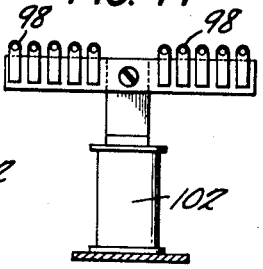
Figure 14 is a section taken on the line XIV—XIV of Fig. 13.
Figure 15:
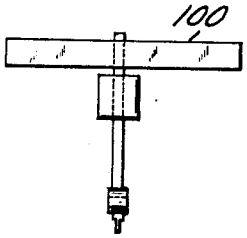
Figure 15 is a front view of the rocking arm of the ten-contact relay.
Figure 12:
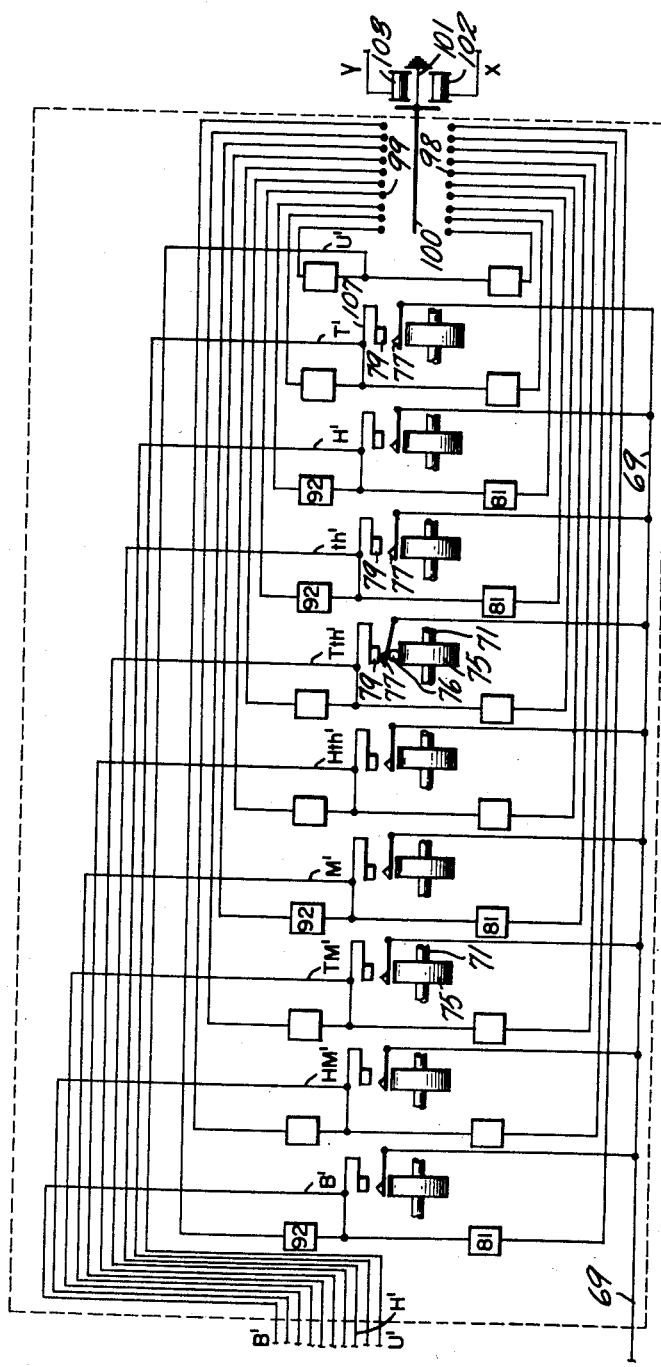
Figure 12 shows diagrammatically the wiring of a complete counter.

Each counter element is actuated through a two-relay device shown in side view in Fig. 7. The assembly of the various relays pertaining to the different elements of a counter, as well as the contactor serving to carry over the units of the different orders, are shown in Fig. 12. The ten-wire reversing switch controlling the adding or subtracting operation of the counter is shown in Figs. 13 to 15.

Figure 8:
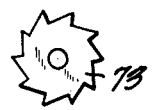
Figures 8 and 9 are detail views showing separately the pair of ratchet wheels incorporated in the assembly of Fig. 7.
Figure 9:
Figure 10:
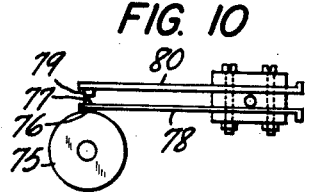
Figure 10 is a detail view of the contactor forming part of the counter.

Each counter element (see Fig. 11) comprises, on a shaft 71 common to the various elements of the counter, a wheel 72 carrying ten digits 0 to 9, a pair of ratchet wheels 73, 74 each provided with ten teeth, the teeth of one ratchet wheel being inclined in the opposite direction relative to those of the other ratchet wheel, as shown in Figs. 8 and 9, respectively. Moreover, the counter element includes a wheel 75 formed with a projection 76 adapted at each revolution to lift a movable contact 77 carried by a resilient blade 78 and to cause this contact to engage a fixed contact 79 carried by a rod 80 (see Fig. 10).

The wheels 72, 73, 74 and 75 are rotatably fast with one another but mounted for loose rotation on the shaft 71.

The first relay of the counter element (Fig. 7) comprises a coil 81 and a movable armature 82 pivotally mounted on a pin 83 and normally urged by a return spring 84 to a position away from the coil core, this spring having one end attached to the armature 82 and the other end anchored to a fixed bracket 85. The armature 82 carries a rod 86 rigid therewith and connected with an arm 88 pivotally mounted on a pivot pin 89. This arm 88 has a pawl-shaped outer end 90 engaging the teeth of the ratchet wheel 73. A spring 91 attached to the rod 86 and arm 88 urges the pawl-shaped end 90 towards the teeth of the ratchet wheel 73.

The other relay of the counter element comprises a coil 92 having a central core and a movable armature 93 associated with the same parts and disposed symmetrically as in the case of coil 81, with the only difference that the pawl-shaped outer end 94 of arm 95 engages the teeth of the ratchet wheel 74 which are inclined in the opposite direction relative to those of the ratchet wheel 73. The arm 95 is connected to the arm 88 through a link 96.

The coils 81, 82 of the counters are both connected on the one hand to the pulse wires U' to B' corresponding to the order of magnitude of the counter element concerned, and on the other hand to respective terminals 98, 99 positioned on the counter reversing switch and belonging each to a group of ten similar terminals corresponding to the coils of the ten counter elements (see Fig. 14). Either all the terminals 98, or all the terminals 99, may be engaged simultaneously by a same, common rocker 100 earthed through a connection 101. For this purpose, the rocker 100 (see Figs. 13 to 15) is controlled by a pair of electromagnets 102, 103 having their windings on the one side connected to the ground through a connection 101 and on the other side controlled by the relevant wires X and Y. The rocker 100 has an intermediate or neutral position in which it engages neither the terminals 98 nor the terminals 99, a pair of springs 104, 105 acting in opposite directions on a projection of the rocker 100 which is positioned beneath its pivot pin 106 to urge the rocker to this intermediate position when no energizing current flows through the windings 102 and 103 of the reversing switch.

The different counter elements, save the units element, also include a wire 107 leading to the connection between the coils 81 and 92. On this wire 107 there is interposed a contactor 77, 79 controlled by the wheel 75 of the adjacent element of the next lower order. Thus, this wire 107 is connected in the circuit each time the projection 76 of this wheel 75 lifts the contact 77. As shown in Fig. 12, the wire 107 is connected through a common wire 69 to the D.C. source 17 of the apparatus, so as to transmit a pulse from this source 17 to the counter element to which the wire 107 is connected each time the contact is closed.

The billions element has neither a wheel 75 nor a contactor controlled by this wheel.

The wires 107 are intended to transmit to the element to which they lead a carry-over pulse when the digit "9" of the adjacent counter element of higher order leaves the panel for substitution by the zero digit, or in the reverse direction when this counter element rotates in the decreasing direction and passes from digit 0 to digit 9. The projection 76 is suitably set for this purpose on the relevant wheel 75.

The ten elements of each counter, as already pointed out hereinabove, are connected to the corresponding wires U' to B' transmitting in turn the numeral pulses transmitted from the pulse generator.

Each reversing switch is connected to the preselector device through a pair of wires X and Y (see Fig. 12); however, the counter C–4—5 is not connected to the preselector as it is not controlled by the keyboard. The reversing switch of this counter is connected through a wire X–4—5 to the wires X–4 and Y–5, and through a wire Y–4—5 to the wires X–5 and Y–4, a rectifier 108 being interposed therein to provide a unidirectional pulse-transmitting line effective in the direction from wires X–4, X–5, Y–4, Y–5 to wires X–4—5 and Y–4—5 but not in the reverse direction.

Similarly, the counter C–87 dealing with the Operation Account has its reversing switch connected through wires X–87, Y–87 on the one hand to the preselector and on the other hand to the different counters dealing with the administration of the firm, i.e. counters C–60, C–61, C–62, C–63 . . . , C–64, C–65 and C–70, so that each operation effected by these counters will also be made in the proper direction in counter 87.

This counter C–87 is so connected that any variations occurring in the counter C–70 are reproduced in the same direction in counter 87 whilst the variations occurring in the other counters are reproduced in the opposite direction.

For this purpose, the wires X–87 and Y–87 are connected through wires 109 and 110 to the wires connected to the rockers of the counters mentioned hereinabove, the connections with the different counters being made as illustrated in Figs. 1b and 1a. Rectifiers 111 are also interposed between these rocker wires and wires 109 and 110, in such a direction that the pulses may flow from these rockers to the wires 109 and 110 and also to the reversing switch of counter 87, but not in the opposite direction.

The counters C–4—5 and C–87, designed to indicate a result which may be positive or negative, are provided with a complemental set of numeral wheels according to the well-known practice. Each element of these counters (see Figs. 16 and 17) comprise, in addition to the parts already described hereinabove, a complemental wheel 112 driven from wheel 72 through a gearing comprising three toothed wheels 113, 114 and 115. The wheel 112 has a different color than wheel 72 and the digit appearing on this wheel through the reading board is the difference between 9 and the digit indicated by the wheel 72 on this reading board. However, the unit wheel 112 will show the difference between 10 and the digit appearing on the reading board on the unit wheel 72. Consequently, if the different wheels 71 show the figure

0002798032 the various wheels 112 will give

9997201968

If a number greater than that previously indicated by the wheels 71 is subtracted from the first figure so that these wheels will indicate the figure

9999954274 the various wheels 112 will give the additional number

0000045726 which is the negative value of the account concerned.

III. PRESELECTOR DEVICE

The preselector device is supplied through its line A' with the selective pulses transmitted from the pulse generator by means of the keys of the A group concerning the different accounts; this preselector closes the numeral pulses through the counter corresponding to the number of selective pulses received through the line A'. Moreover, the circuits transmitting the numeral pulses to the counter concerned are completed either through the coils 81 and terminals 98, so that the counter will effect an addition, or through the coils 92 and terminals 99, so that the counter will effect a subtraction, according as the operator has actuated either one of the keys CB and CO of the credit operations or one of the keys DB or DO of the debit operations.

The preselector device comprises a pair of selectors Z, Z' identical with the selector S of the pulse generator and shown diagrammatically in Fig. 1b, wherein their control windings 120, arms 131, contacts 132, pivot pins 134 and return coils 133 are clearly shown. The control coils 120 of the two selectors Z, Z' are earthed on the one side and connected to a reversing switch 119 on the other side, so that either one or the other of these coils may be connected to the line A' from the pulse generator, this line transmitting the selective pulses, as already pointed out. This reversing switch 119 is controlled by a pair of windings 121, 122 both connected across the D.C. source 17 and the earth at 123. The first winding 121 when energized connects the reversing switch 119 across the control coil of selector Z and is mounted in series with a switch 124 adapted to close when any one of keys CB or CO is depressed to perform a credit operation. The other winding 122 when energized connects the reversing switch 119 across the control coil of selector Z' and is similarly controlled by a switch 125 which closes when any one of keys DB or DO of the keyboard is depressed to accomplish a debit operation.

Each contact 132 of selector Z is connected to the wire X of the reversing switch of one of the counters, and, as already explained hereinabove in the detailed description of each counter and as will be better understood if reference is made to Fig. 13 of the drawings, the winding 102 is energized through this circuit line X and causes in turn the rocker 100 to contact the ten keys 98 thereby feeding the pulses to the winding 81 so that the latter will rotate step by step a numeral wheel 72 of the counter in the direction of progressively increasing digits. This numeral wheel will thus perform an additive operation. Each corresponding contact of selector Z' is connected to the wire Y of the same counter, thereby completing the circuit to the other winding 92 which causes the same numeral wheel to accomplish a subtractive operation.

To properly operate the apparatus it is essential to actuate the different keyboard control members in the proper sequence and at the suitable rate.

Firstly, the motor switch c must be operated to close the motor circuit supplying electric current to the motor 10; this will switch on the tell-tale lamp v. Upon each revolution the cam 12 causes the movable contact 14 to engage the fixed contact 15, thereby enabling the D.C. source 17 to supply electric pulses. Then the operator depresses the proper key DB, CB, DO or CO, i.e. the key controlling the preselector corresponding to the account in which an entry is to be registered, and subsequently the operator depresses the key of the account concerned. It is now possible to register the number relating to this account by depressing in each row of a decimal order the key carrying the numeral corresponding to the digit of this decimal order of the number to be registered. As this registration is effected the different keys must be depressed but care must be taken not to depress another key until the depression of a preceding key has been followed by the complete registration of the corresponding partial operation by the relevant counter.

The arms 131 of selectors Z and Z' which engage the contacts 132 are both connected to the D.C. source 17 through a switch 126 which is set and retained in its closed position when the engagement bar E of the keyboard is depressed.

Finally, both return coils 138 of selectors Z and Z' are connected between the ground and the D.C. source 17. They are controlled by a common switch 127 which is adapted to close when the return bar R of the keyboard is depressed.

IV. OPERATION OF THE APPARATUS

For the sake of clarity, I shall now describe first the operation of a selector and then of a counter. Finally, the operation of the apparatus as a whole will be discussed by analyzing the operation of the various components thereof in connection with a book-keeping operation taken as a practical example.

(a) Operation of the pulse generator

If, after having actuated the control lever of switch c to the On position and depressed one of the four keys DB, CB, DO, CO as already stated hereinabove, any key from the groups U to B of the keyboard is depressed, for example key 3 of group H (see Fig. 2), this key will remain in its depressed condition and the switch 49 corresponding thereto will connect the wire 50 of group H to each wires 48.1, 48.2 and 48.3 of this group. In other words, switch 49 of key 3 will thus connect the coil 20 of selector S of group H to the first three contacts 32.1, 32.2 and 32.3 of the same selector.

From this time on the circuit of contactor 14, 15 from the D.C. source 17 to the ground is closed through the pivot pin 34 of selector S of group H, arm 31 of this selector, contact 32.1 engaged by this arm, wire 48.1 connected to this contact, switch 49 of key 3, wire 50, coil 20, winding of relay 52 and connection 53. When the cam member 12 causes the contacts 14, 15 to engage each other an electric pulse flows through this circuit. Consequently, coil 20 (see Fig. 3) attracts the armature 21 against the resistance of its return spring 23, and also the rod 25 associated with the armature 21, so as to cause this assembly to rotate in the direction of the arrow F. The lever 24 pivoted on rod 26 through the pivot pin 25 is pulled in the same direction. The pawl 27 pivoted on this arm is thus caused to slide on the inclined face 59 of the tooth adjacent to the interval in which it was previously engaged, the ratchet wheel 28 being prevented from rotating with this pawl 27 by the resilient pawl 29. Then, the pawl 27 urged by spring 19 is snapped into the interval following the tooth on which it has been moved. When the electric pulse thus transmitted through the contactor 14, 15 is completed, the return spring 23 moves the armature 21 and rod 26 in the direction opposite to that indicated by the arrow F. Then the arm 24 is pushed back in the same direction by the rod 26 so that the pawl 27 will bear against the radial face of the tooth and cause the ratchet wheel 28 to rotate. The amplitude of the angular movement effected by the pivot pin 25 is slightly greater than the length of the inclined face 59 of the tooth but shorter than twice this length, so that the ratchet wheel 28 will be rotated through a distance corresponding to one tooth or pitch upon each return stroke of the arm 24. The resilient pawl 29 will not counteract this angular movement and engages the interval adjacent to that in which it was previously engaged. As the ratchet wheel 28 has effected a one-tooth movement, the outer end of arm 31 will now engage the second contact 32.2 of the selector.

As the pulse is fed through this circuit the selector winding 20 connected in series with the wire 53 will close the contactor 54 and the latter will be re-opened when this pulse is completed. Thus, an electric pulse transmitted from source 17 will circulate through contactor 54 to wire H'.

When the cam member 12 causes the contacts 14, 15 to engage each other for the second time, another electric pulse is fed through the windings 20, 52 and this time the pulse will flow through the second contact 32.2 engaged by the selector arm 31 and also through the selector line 48.2. As in the case of the first pulse, the coil 20 causes the ratchet wheel 28 to rotate through one tooth or angular interval, thus causing the selector arm 31 to engage the third contact 32.3, whilst a second pulse is sent through the line H' from the contactor 54 actuated by the coil 52.

As the arm 31 is positioned on the contact 32.3 the third pulse emitted from contactor 14, 15 actuated by the cam member 12 flows through the wire 48.3. Then the coil 20 causes the ratchet wheel 28 to rotate through another angular interval of one tooth, thus positioning the arm 31 on the fourth contact 32.4 of the selector. Meanwhile, contact 54 actuated by coil 52 produces a third pulse in the line H'.

As the arm 31 engages the fourth contact 32.4, the fourth pulse from contactor 14, 15 is transmitted through this contact to the relevant line 48.4. However, as the key 3 of group H did not connect the wire 48.4 to wire 50, this pulse will not be transmitted to the coils 20 and 52. The arm 31 remains on the fourth contact 32.4 and no other pulse is fed to the line H' after the third pulse.

Then, if other keys of any group U to B on the keyboard are depressed, the pulse generator will be operated each time in the manner just described.

Now, if the return bar R is depressed, it will close the circuit of the return coils 38, thus attracting all their armatures 39 and the rods 42 associated therewith. All the arms 24 and pawls 29 of ratchet wheels 28 are raised simultaneously by the edge portions of notches 45 and 46 (see Fig. 4) so that all the ratchets 28 will be urged in the clockwise direction by their spiral springs 33. Thus, all the arms 31 which are positioned otherwise than for engagement with the first contacts 32.1 of their respective selectors, as the arm 31 of the selector of group H will be restored to this initial position. The return bar R of the keyboard will simultaneously raise from their depressed positions all the keys previously depressed by the operator, notably the key 3 of group H, in this example.

All the selectors S of groups U to B operate in the manner just described, as well as selector S' of group A, with the only difference, as regards this last-mentioned selector, that the number of pulses transmitted by means of the different keys may vary from 0 to 15, according to the key depressed by the operator, instead of from 0 to 9.

Both selectors Z and Z' of the preselector device operate in the same manner, except that they are not equipped with a coil similar to coil 52 and in series with their control coil 120 for transmitting pulses to a line.

(b) Operation of a counter

Now let us assume that the rocker 100 of the counter shown in Fig. 12 has already been operated to engage the ten contacts 98 through actuation of the winding 102 energized through the line X by the preselector.

Let us further assume that pulses are transmitted through one line, for example three pulses through line H' by depressing the key 3 of the keyboard group H.

These pulses will pass from line H' to the ground through the coil 81 of the counter element indicating the hundreds. The first pulse flowing through this coil 81 (see Fig. 7) will attract the armature 82 and the rod 86 fast therewith against the resistance of spring 84. Thus, this rod 86 will pull the arm 88 and the pawl-shaped end 90 thereof will run over the inclined face 97 of the adjacent tooth of the ratchet wheel 73 before engaging the next interval. When this pulse is completed the spring 84 returns the armature 82 and rod 86 to their initial positions.

This rod 86 will also move the arm 88 so that the pawl-shaped end 90 thereof will engage the radial side of the adjacent tooth of ratchet wheel 73. As this pawl-shaped end 90 of arm 88 engages the said interval, the arm 88 urged by the link 96, moves the arm 95 disposed symmetrically to the arm 88, and the pawl-shaped end 94 thereof is moved away from its ratchet-retaining position, so that both ratchet-wheels 73 and 74 are unlocked and the pawl-shaped end 90 acting on the radial side of the adjacent tooth of its relevant ratchet wheel 73 will rotate the latter through an angular interval of one tooth. As a result, the wheel 72 will be rotated through the extent of one digit.

The other two pulses will rotate the wheel 72 by two more digits. The number shown by the wheel 72 through the panel, after these three pulses, is three units higher than the previously indicated number.

Assuming now that the rocker 100, instead of engaging the ten contacts 98, engages the opposite ten contacts 99 due to the energization of winding 103, it is apparent that under these conditions the coil 92 of the counter element will be energized instead of coil 81. Thus, the ratchet wheel 74 will be rotated through an angle of three teeth in a direction opposite to that previously indicated with reference to the ratchet wheel 73. The wheel 72 will rotate by three digits in the same direction and cause a number three units lower than the preceding number to appear through the panel.

If, during the rotation of the hundreds wheel 72 in the 0 to 9 direction the indication given by this wheel through the panel passes from digit 9 to digit 0, the projection 76 of wheel 75 of the counter element will lift the contact 77 to cause same to engage the fixed contact 79 connected through the line 107 of this hundreds counter element to the electromagnets 81, 92 (Fig. 7) controlling the thousands counter element. This line 107—thus connected through the common line 69 to the source 17—will feed a pulse from this source to the winding 81 of the thousands element and this pulse will be earthed through the counter terminal 98. The energization of this coil causes the number indicated by the thousands wheel 72 to be stepped up by one unit.

Similarly, if the hundreds wheel 72 rotates in the 9 to 0 direction so that the indication given by this wheel through the panel aperture passes from digit 0 to digit 9, the contact 77 lifted by the projection 76 will feed a pulse to the coil 92 and terminal 99 of the thousands element, this pulse being subsequently transmitted to the ground. As a result, the coil 92 will rotate the relevant wheel 72 through an angular distance of one digit or unit.

The complemental wheel counters operate in the same manner and the complemental wheels thereof are driven from the main wheels 72.

(c) Operation of the complete apparatus

Now I shall describe the operation of the apparatus as a whole by taking as an example the following entry:

DO 60 : Sales : : : 523 : :
CB 41 : To customers : : 523 : : :

assuming that the 60 account (Sales) has an amount of 6,425,850 registered by its counters, and that the 41 account (Customers) shows a registered amount of 2,927,028.

The operator first actuates the keyboard switch c to the On position, thereby lighting the pilot-lamp v and starting the electro motor 10; then the DO key is depressed, since the operation deals with the Operation Account.

This causes the switch 125 (Fig. 1b) to be closed to energize the coil 122, so that the reversing switch arm 119 will connect the coil 120 of selector Z' with the line A'.

To identify the Sales account, the key 70 (see Fig. 1c) is depressed and the arm 31 of selector S' of the pulse generator is moved through six contacts so as to send six pulses through the line A'. As the arm 131 of selector Z' is actuated by its coil 120 fed by these six pulses, this arm 131 will move through six contacts and be stopped on the contact 132 connected with the Y-70 line.

Then the engagement bar E of the keyboard is depressed to close the contact 126. Current is thus caused to flow in this line Y-70 and the rocker 100 of counter C-70 is attracted for engagement with the contacts 99, thereby preparing the subtraction recording of the number to be subsequently transmitted in the form of numeral pulses.

Then, key 5 in the hundreds group H, key 2 in the tens group T, and key 3 in the units group U are depressed in succession. The pulse generator operating as already explained hereabove, supplies five pulses to line H', then two pulses to line T'; and three pulses to line U'.

The counter C-70 records these pulses in the 9 to 0 direction on its wheels 72 indicating the hundreds, tens and units.

Since its previous indication was 6,425,850, the hundreds will pass from 8 to 3, the tens from 5 to 3, and the units from 0 to 7. As the units wheel passes from 0 to 9, it releases a carry-over pulse which causes the tens wheel to rotate by one unit in the 9 to 0 direction, that is to say, from 3 to 2. Finally, the counter will indicate 6,425,327. Meanwhile, the other counter C-87 was actuated in the same direction by the same pulses through the wires 109 and 110 across the valve means 111.

Subsequently, the return bar R is depressed to re-set all the keys and as it closes the contact 127 momentarily, it causes all the arms of the previously actuated selectors to be released and restored to their initial positions by their spiral springs. More specifically, the upward movement of the engagement bar E opens the supply circuit of counter C-70, thereby releasing its rocker 100 to its intermediate position.

Then the key CB is depressed to energize the coil 121 and move the reversing arm 119 to connect the coil 120 of selector Z with the supply line A'. Then key 61 is depressed and selector S' supplies a pulse to the arm 131 of selector Z, and this arm is stopped on the first contact 132 of the selector, which is connected to the line X-61. The engagement bar E is depressed and its contact 126 will supply current to the line X-61. The rocker 100 engages the contacts 98 to prepare the recording in the adding direction of the number to be subsequently transmitted to the counter C-61 in the form of numeral pulses. Finally, the number 523 is set by means of the keys on the keyboard and the indication of counter 61 will be increased by 523.

Of course, many modifications and alterations may be brought to the form of embodiment described hereinabove and shown in the attached drawings, both with respect to the details of the electric wirings of the different members and to the very structure of these members.

It will be readily understood by anybody conversant with the art that the number and/or arrangement of the counters may differ from those indicated.

Thus, for example, the sixteen counters of the panel may also be arranged for recording automatically the results of an industrial accountancy, also called Analytical Operation Accountancy from which the following information may be obtained in a very practical form:
Estimation of cost prices.
Calculation of final results for each Branch, Branch Division or Subdivision in a given production plant.

As a rule, it is evident that various details may be suppressed, substituted or modified in the arrangement described and shown, as well as in the operation thereof, without altering to any appreciable extent the general economy of the invention.

Moreover, by interconnecting the keyboard of this invention on an accounting machine of the four-totalizer type it is possible to afford a permanent checking of the entries concerning the balance (assets and liabilities) and the operation account (debit-credit).

Without departing from the spirit and scope of the invention, the apparatus may comprise a plurality of reading boards adapted to be mounted in different offices, for example, these reading boards having their counters connected in parallel for simultaneous control from a common keyboard of the apparatus.

What I claim is:

1. An apparatus for indicating the state of the different accounts of a bookkeeping system by successively registering the numbers necessary for keeping the accounts up to date comprising, a plurality of accumulators each corresponding to one of said accounts, a panel having separate openings through which said accumulators are separately viewable, means mounting the accumulators beneath corresponding openings of said panel, a row of keys mounted on and projecting from said panel, each of said keys corresponding to a group of accounts all of which are credit and debit accounts, a second row of keys each corresponding to one of said accounts, ten other rows of keys, each of said ten rows corresponding to a decimal order of numbers to be registered by said accumulators and comprising ten keys marked from zero to nine, a pulse generator connected to supply discrete pulses to said counters comprising, an electrical circuit including a source of current, a driven contactor for making and breaking the circuit to generate discrete pulses therein, ten lines corresponding to a decimal order of the numbers to be registered, for each key a contactor controlled by one key of the row of the same decimal order and adapted to allow therethrough a number of pulses emitted by said generator from said source which is equal to the numeral on the key concerned, groups of ten branch-circuits connected to said ten circuit lines, each of said ten groups of ten branch-circuits being connected to transmit to each of said accumulators and in the decimal order of that row among said last-mentioned rows of keys in which one key has been depressed a number of pulses equal to the numeral marked on the key depressed, reversing switches each co-active with a corresponding one of said accumulators and having means settable in one of three positions said positions corresponding to an inoperative position to prevent said pulses from being fed to the counter and two operative positions in which said pulses are fed to said corresponding accumulator to actuate it in an additive direction in one of said operative positions and in the subtractive direction in the other of said operative positions, preselector means having means to actuate the reversing switch of the counter corresponding to the account in which a number is to be registered and to set said reversing switch in the operative position corresponding to the account selected by actuation of a key of said first row and by depressing a key of said second row.

2. An apparatus according to claim 1, in which each of said accumulators comprises, a plurality of interconnected elements arranged in decimal order each element comprising a ten-digit wheel, for each element a pair of ratchet wheels mounted on said wheel and each having a set of ratchet teeth for each wheel, a pawl associated with a corresponding wheel for engaging its set of ratchet teeth, for each pawl an electromagnet, electrical connections for energizing said electromagnets, said electromagnets each having in operation a characteristic such that one is operable for carrying out additive operations and the other is operable to carry out subtractive functions, the reversing switch of the accumulator being connected to said connections so as to break the circuit of said pair of electromagnets in its inoperative position and in its operative position to allow energization of one of said electromagnets so as to actuate the corresponding pawl and impart step-wise rotation to said ten-digit wheel in the direction corresponding to a key depressed in said first row, the step-wise rotation corresponding to the number of pulses received by said electromagnet, a plurality of other contactors, each other contactor being disposed so as to be controlled by the wheel of a corresponding one of said elements except the element of the higher decimal order, electrical connections between said other contactors and said source of direct current and the electromagnet of the element pertaining to the next higher order, each other contactor being disposed so as to be closed by a wheel of a corresponding element concerned when said wheel passes from one to the other of the digits 0 to 9 to apply to the electromagnet through which the pulses flow from said pulse generator a pulse so as to rotate said element of the next higher decimal order through one unit in a direction of rotation corresponding to said operational characteristic of the corresponding electromagnet.

3. An apparatus according to claim 1, including an eleventh circuit line connected to the keys of said second row to receive a number of pulses representative of the account corresponding to the individual key, said preselector means comprising a reversing switch and a pair of selectors, said reversing switch having means operable to an additive position and a subtractive position upon actuation of a key in said second row, and according as the relevant account is additive or subtractive, connections for applying a number of pulses representative of an account to one of said selectors from said reversing switch when a corresponding key is actuated, each of said selectors having a movable arm and contacts corresponding separately to each of said accounts, the arm of the selector being operable to operative positions by the reversing switch of the preselector means in response to the pulses transmitted through said eleventh line so as to engage the contact of the account characterized by the number of pulses transmitted through said eleventh line, electrical connections between both arms and said direct current source including a contactor, an interlocking bar operable before depressing the keys of the last ten rows for closing said contactor, electrical connections connecting contacts of said selectors separately to the reversing switches of said accumulators, whereby when the selector is operated to an operative position by said reversing switch of the preselector means the reversing switch of the accumulator corresponding to the contact on which its arm has stopped in its operative positions is set to allow pulses received from the first ten lines to actuate the corresponding accumulator in a direction corresponding to an additive or subtractive direction.

4. An apparatus according to claim 2, in which the reversing switch of each accumulator comprises a first electromagnet and a second electromagnet for controlling said counter to set the reversing switch of said counter in one of two operative positions, said first and second counter-controlling electromagnets being connected to close said eleventh pulse circuit in both adding and subtracting directions respectively.

5. An apparatus according to claim 4, in which said preselector means comprises a reversing device electromagnetically controlled from said source upon actuation of one of the keys of said first row, said reversing device having means operable to one lateral position when said key of the first row corresponds to a credit account and an opposite lateral position when said key corresponds to a debit account, electrical connections comprising a selection line including a contactor controlled by one of the keys of the other row and having means to allow therethrough a number of pulses from said pulse generator representative of the account corresponding to said key of the second row, said line being connected to said reversing device, a pair of selectors, one of said selectors having electrical connection through said reversing device to the selection line when one of the keys of the first row is depressed, each of said selectors having as many contacts as there are accounts, electrical connections between the contacts of said selectors and the first and second electromagnets controlling respectively the different counters, each of said selectors comprising an arm connected to said direct-current source and operable when said selector is connected to said selection line in response to the electric pulses to engage the contact connected to that of the two control electromagnets which correspond to the key depressed in the first row of keys in the accumulator corresponding to the key depressed in the second row of keys.

6. An apparatus according to claim 5, in which said accumulator comprises a first group and a second group of counters, said second group comprising a first accumulator corresponding to a credit account, a plurality of debit-accounts accumulator and a last accumulator, said electrical connection between first and second control electromagnets of said last accumulator of said second group of accumulators connected to said contacts transmitting the currents delivered upon depression of the key corresponding to the account of said counter respectively in said first and second selectors of the preselector group including connections to the contacts receiving the pulses delivered upon actuation of the key corresponding to the account of the first counter respectively in said first and second selectors of the preselector group and to the contacts receiving the pulses delivered upon actuation of the keys corresponding to the accounts of the other accumulators in the second and first selectors respectively of the preselector group.

7. An apparatus according to claim 6, in which said first group of accumulators comprises a first accumulator of a credit group and a second counter of a debit group, an auxiliary accumulator co-acting with said first and second accumulators of said first group of counters to permanently show the algebraic excess of the value of the first account over the value of the second account, electrical connections between said auxiliary accumulator to the ten lines corresponding respectively to each of the decimal orders of the numbers to be recorded and having a first control electromagnet connected to the contact transmitting the pulses delivered upon depression of the key corresponding to the account of the first counter into the first selector of the preselector group and to the contact transmitting the currents delivered upon depression of the key of the second counter into the second selector of the preselector group, and another control electromagnet connected to the contacts transmitting the currents delivered upon depression of the key corresponding to the account of the first accumulator into the second selector of the preselector group and to the contact transmitting the currents delivered upon depression of the key corresponding to the account of the second accumulator into the first selector of the preselector group.

8. An apparatus according to claim 7, including two series of connected elements comprising each a ten-digit wheel operably co-acting respectively with the auxiliary accumulator co-active with the first group of accumulators and with the last counter of the second group of accumulators to permanently show the complementary numerals of the amounts indicated by said auxiliary accumulator respectively, said auxiliary counter having means for co-acting with the first group of accumulators and the last accumulator of the first group of accumulators.

References Cited in the file of this patent

UNITED STATES PATENTS

| | | |
|---|---|---|
| 2,277,250 | Nyberg | Mar. 24, 1942 |
| 2,432,324 | May | Dec. 9, 1947 |
| 2,528,394 | Sharpless et al. | Oct. 31, 1950 |
| 2,535,218 | Marble | Dec. 26, 1950 |
| 2,663,495 | Ramsell et al. | Dec. 22, 1953 |
| 2,765,116 | Sobisch | Oct. 2, 1956 |

FOREIGN PATENTS

| | | |
|---|---|---|
| 270,044 | Great Britain | May 6, 1927 |